May 14, 1968   J. U. GELLERT   3,383,493
HEATER BLOCK AND PROCESS FOR PRODUCING SAME
Filed Sept. 15, 1965   2 Sheets-Sheet 1
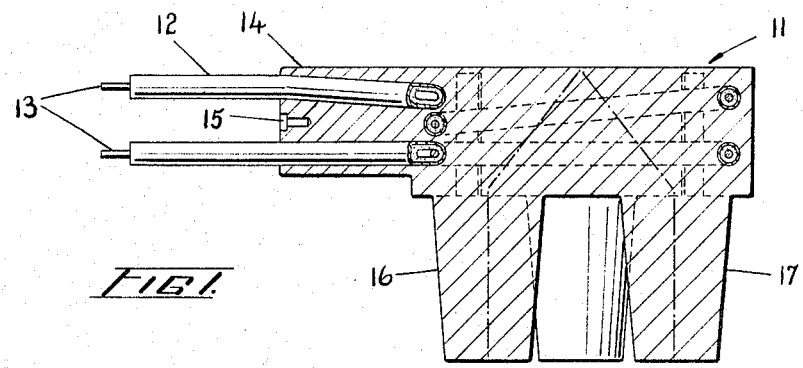
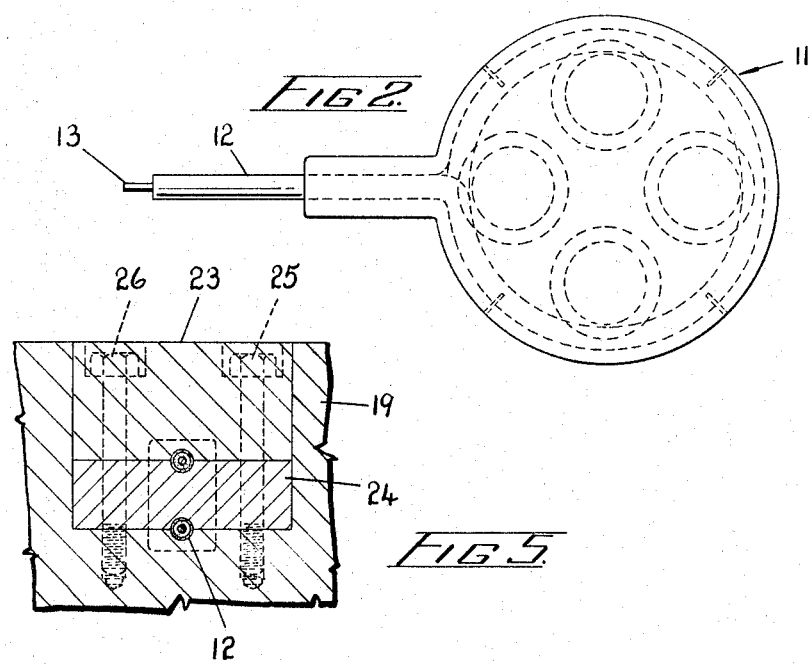
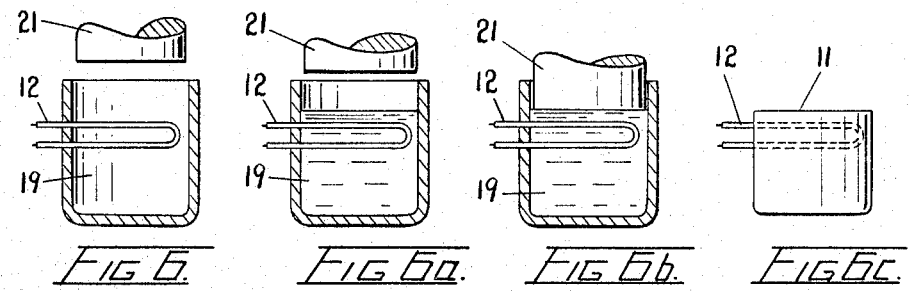
INVENTOR
JOBST ULRICH GELLERT
BY
ATTORNEY United States Patent Office 3,383,493
Patented May 14, 1968

3,383,493
HEATER BLOCK AND PROCESS FOR
PRODUCING SAME
Jobst Ulrich Gellert, 227 Viewmount Ave.,
Toronto, Ontario, Canada
Filed Sept. 15, 1965, Ser. No. 487,385
7 Claims. (Cl. 219—200)

ABSTRACT OF THE DISCLOSURE

A heater-block or hot-runner for use in plastic-injection moulding machines comprising a unitary, pressure-cast block of beryllium copper, suitably shaped and having cast therein a looped heater element disposed in symmetrical relationship to the block to provide substantially uniform heating thereof.

This invention relates in general to heater units and more specifically to heater blocks for hot-runner molds in the plastic injection molding field.

Many deficiencies exist in heater blocks in current use, most of these deficiencies stemming from poor heat transfer characteristics. Specifically, in order to obtain the desired heat supply for a given application, present heaters have to be operated at full output. Such operation results in frequent element failures with the necessity of maintaining adequate supplies of replacements. In addition, the rate of production and production costs suffer as a result of a shut-down for maintenance purposes.

As is well known, conventional blocks utilize either "strap-type" or "cartridge-type" heater elements. Naturally, a strap-type heater, that is, an element adapted to be wrapped around an object to be heated, is inefficient in the extreme as regards its intended function of directing heat flow in the desired direction. Due to high heat losses, it is necessary to utilize the highest wattage elements possible in order to obtain sufficient heat transfer to the block.

In plastic injection equipment, compactness of the related parts is obviously essential such that the strap-type heater unit, in the great majority of cases, has to be custom-built to suit various machines and various applications.

To some extent, the space problems of the strap-type heater has been overcome by the introduction of cartridge heater elements, heater blocks being bored wherever suitable and the cartridges inserted in the bores. While this expedient overcomes, in part, the space problem, it will be appreciated that machining of the bores for the cartridges greatly increases the expense of the heater unit, and, unless the machining is extremely accurate, one is still faced with the problem of poor heat transfer between heater element and heater block. Further, depending upon the particular application involved, it is seldom possible to insert sufficient cartridges in the most suitable locations to effect the high, uniform heating of the block itself.

A still further disadvantage in regards the use of cartridge heaters in hot-runner mold heater blocks resides in the problems of maintenance. Cartridge heaters have a restricted life expectancy, especially when consistently operated at full load. Replacement can often lead to damage of the bore in the block, further decreasing heat transfer efficiency upon insertion of a replacement cartridge.

From the foregoing, it will readily be seen that current heater blocks have two major drawbacks. Basically, they are relatively inefficient, and, stemming from this inefficiency are so bulky in general that it is substantially impossible to provide standard off-the-shelf blocks for multipurpose uses.

In order to overcome the defects forementioned, the present invention sets forth a new and novel method of manufacturing the subject heater blocks which results in a new and novel block structure at one and the same time highly efficient as regards heat transfer and also very compact such that standardization of heater block units for plastic injection molding equipment is now possible.

It is an object of the present invention to provide a method of manufacturing heater blocks for hot runner molds such as to produce a novel, compact heater block unit having superior heat transfer characteristics than those obtained heretofore.

It is a further object of the present invention to render possible the manufacture of a novel heater block capable of standardization in that said block is capable of functioning in a variety of molds.

In accordance with the present invention the foregoing objects are achieved by the very simple but unobvious utilization of a combination of known, diversified, expedients. In very general terms, the invention herein resides in pressure casting a looped, continuous heater element into a heater block to ensure permanent, intimate contact between the heater element and the surrounding block. By this expedient, several important advantages are obtained.

By pressure casting the block around the heater element, the latter inherits a vastly prolonged useful life and also ensures a substantially uniform heating effect throughout the block.

It is also pointed out that the pressure effect ensures a solid, uniformly dense structure, free from obviously undesirable gas pockets. In addition, the pressure casting enhances the heat transfer characteristics of the heater block.

It will be appreciated that encasing a heater element not only minimizes the overall size of a heater block and prolongs the life expectancy of the heater element, but, in addition, permits operation of the heater, in some cases, at something below maximum output. This provides a heat reserve for particular circumstances such as when working with nylon or similar materials requiring considerable heat for maintenance in the fluid state.

With further reference to size considerations, it will be noted that the volumetric ratio as between continuous looped heaters and cartridge heaters having the same voltage, is approximately 1:1.5 or 2. This fact, coupled with the far superior heat transfer characteristics of the present invention clearly illustrates the advantages obtained as regards relative overall heater block dimensions.

The present invention permits of integrally casting the injection nozzles with the main portion of the block. In this manner, heat flows to the nozzle portions in comparable fashion to the flow of heat in a common soldering iron since there is no discontinuity of the solid material of the heater. As is known, any gap or discontinuity between two surfaces definitely and adversely affects heat transfer between such surfaces.

It will be understood that, if preferred, injection nozzle adaptor sockets may be inserted into the block. In this way, various nozzles of different diameters and/or lengths may be inserted as desired. It has been found that, even when separate nozzle elements are inserted into the blocks of the present invention there is still a sufficient flow of heat to the nozzles to substantially obviate the necessity of additional heater elements in or around the flow line. To those persons skilled in this field, it will be common knowledge, that in conventional equipment, the necessity for such additional elements is a serious problem. As mentioned above, space is at a premium in the type of equipment under consideration herein.

The invention herein will be more readily understood from the following detailed description of an embodiment taken in conjunction with the appended drawings wherein—

FIGURE 1 is a diagrammatic cross-sectional view illustrating one embodiment of the heater block according to the present invention.

FIGURE 2 is a top plan view of a heater block as illustrated in FIGURE 1.

FIGURE 5 is a partial cross-section taken along line 5—5 of FIGURE 3.

Figure 3:
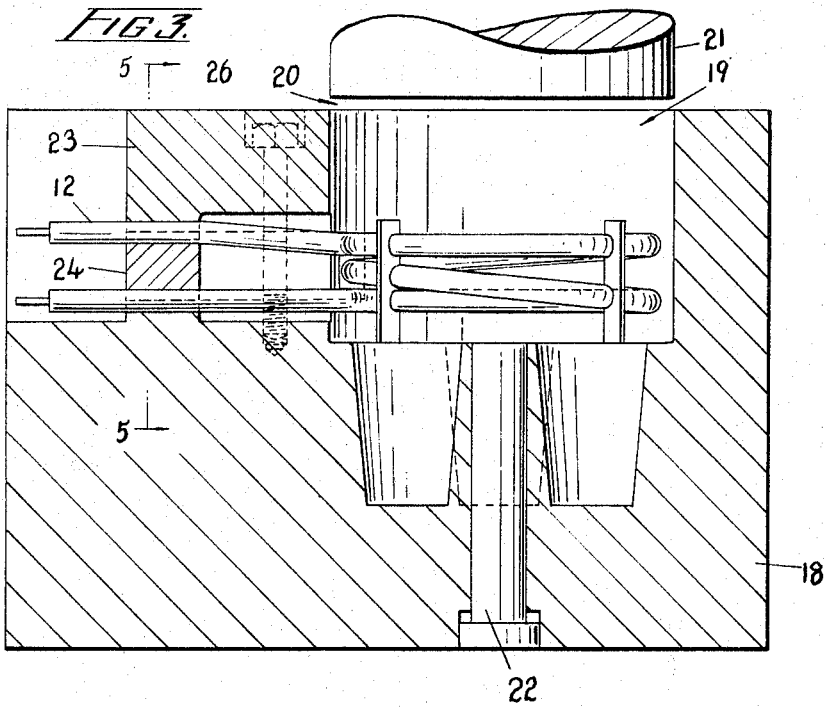
FIGURE 3 is a diagrmmatic cross-sectional view of a mold containing a heater block according to the present invention.

FIGURES 6–6c form a diagrammatical representation of the process steps according to the present invention.

With paritcular reference to FIGURE 1, an illustrative embodiment of the heater block 11 according to the invention is disclosed comprising a pressure cast block, preferably of beryllium copper alloy, having cast therein, a looped, continuous heater element 12. In a preferred embodiment of the present heater block, the heater element used is a "Calrod" element manufactured by the General Electric Company. This element is electrical and is completely encased in a seamless stainless steel sheath, one of its many suitable features residing in the fact that it can be bent to any desired shape. Naturally, there are many other known types of heater elements which could be used without departing from the spirit and scope of the present invention.

As illustrated in FIGURE 1, the heater element 12 is formed in a circular spiral fashion with only two end terminals 13, 13 protruding from a projection 14 integral with the block 11. In order to ensure maximum life expectancy from the heater element, as much of the element as possible must be encased within the block.

Between terminals 13, 13 is located a suitable socket means 15 operable to receive and retain a thermocouple (not shown). This location of the thermocouple has proven to provide a very accurate indication as to the average temperature of the heater block. Further, utilization of the space between the element terminals assists in maintaining the overall dimensions of the heater unit at a minimum. Still further, positioning of the thermocouple in such a location greatly facilitates access for control.

Again referring to FIGURE 1, it will be noted that the heater block may be provided, at its lower end, with a plurality of nozzle projections, two of which are shown and indicated by the numerals 16 and 17.

As indicated by means of centre lines on FIGURE 1, feed passages may be machined in the block leading from a common feed aperture through the space surrounded by the heater element to the nozzle outlets.

Figure 4:
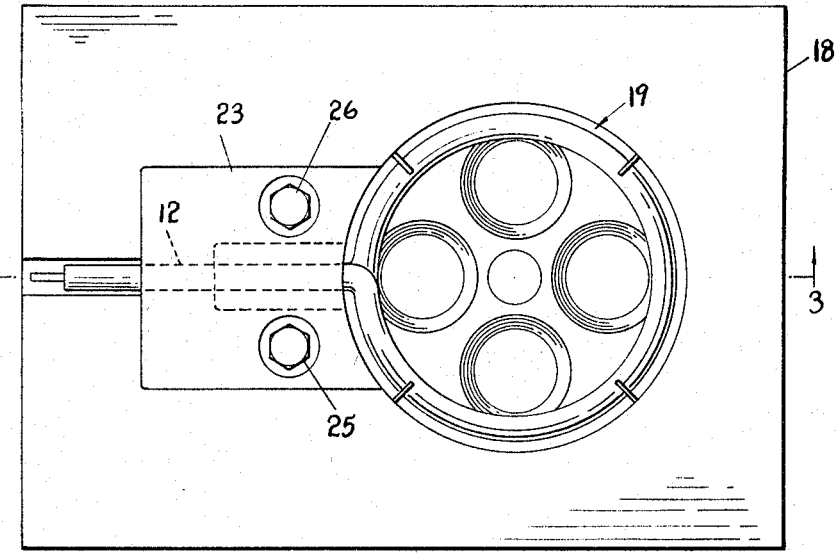
FIGURE 4 is a top plan view of the mold illustrated in FIGURE 3.

Turning to FIGURES 3, 4 and 5, there is shown a typical form of mold 18 adapted for the manufacture of the novel heater block herein disclosed.

Mold 18 includes a cavity 19 contoured to the desired shape of the heater block and having an upper open end generally designated by the numeral 20. In the illustrated embodiment, a circular cavity is shown, however, any desired configuration may be provided. FIGURE 3 illustrates a ram member 21 having an outer surface configuration matching the peripheral contour of the cavity 19 and open end 20. Ram member 21 is operable, by hydraulic or other known power means (not shown), to reciprocate in the cavity 19 for the purpose of pressurizing molten material introduced therein.

The mold 18 is further provided with a bottom insert 22 which may be removed to facilitate ejection of the complete casting.

With further reference to FIGURE 3, and also FIGURES 4 and 5, it will be seen that removable clamping block 23 and a spacer block 24 are provided to locate the heater element 12 in the mold cavity 19. Bolts 25 and 26 or any other known and suitable expedient may be used to removably connect a block 23 and spacer 24 to the main portion of the mold 19.

In order to ensure that the vertical spacing between the heater element loops is maintained during pressure casting of the heater block, and also to axially align the heater in the mold, spacer inserts 27 are provided as clearly indicated in FIGURES 1 and 2. Spacer inserts 27 may be of any particular type, those shown being manufactured from sheet metal and having a pair of spaced notches divided by a bridge or partitioned portion.

With reference to the method of manufacture of the heater block, FIGURE 6 is presented to diagrammatically depict the sequence of operations.

Firstly, a desired heater element 12 is securely located in the mold cavity 19 and then molten beryllium-copper alloy is introduced to completely envelop the element 12. The cavity 19 is filled to a predetermined level and then pressure is applied in the order of 100 to 200 tons per square inch by ram member 21. When complete solidification of the heater block has taken place, the pressure is removed and the cast heater block is withdrawn in known manner from mold 17.

It should be pointed out that any other known pressure casting expedient, capable of effecting the desired pressures, could be substituted for the particular pressurizing method disclosed and illustrated herein.

Following machining of the feed passages etc., the heater block is heat treated to produce a hardened block. The methods of heat treatment of beryllium-copper are well known in the art and it is not believed necessary to elaborate on such methods herein.

Upon reading the foregoing, it may well become apparent to those skilled in the art that certain modifications and changes could be made to the present invention without departing from the spirit and scope thereof as defined in the following claims.

What I claim as new and desire to protect by Letters Patent of the United States is:

1. The process of manufacturing a heater block for a hot runner mold comprising essentially the steps of:
   (a) mounting a looped electric heater element in a mold form and spacing the element inwardly from the walls of the mold form;
   (b) introducing molten beryllium-copper alloy into said mold form to completely encase said heater element;
   (c) applying pressure to said molten beryllium-copper alloy until complete solidification has taken place to eliminate all voids and prevent the trapping of gases, thereby obtaining intimate contact between the surfaces of the heater element and the surrounding alloy.

2. The process as defined in claim 1 wherein said heater element is looped in circular spiral form to effect a substantially even distribution of heat throughout the heater block.

3. The process as defined in claim 1 wherein said molten beryllium-copper alloy is subjected to a pressure in the range of 100 to 200 tons per square inch until solidification of the alloy has taken place.

4. A heater block comprising in combination:
   (a) a mold form;

(b) a looped heater element mounted therein and spaced inwardly from the walls of the mold form;

(c) a block of beryllium-copper alloy pressure cast in in situ until completely solidified, said alloy filling said mold form and completely encasing said heater element therein, said block being free of voids and trapped gases.

5. A heater block as defined in claim 4 wherein said looped heater element consists of an elongated tubular electric element formed in circular spiral fashion and symmetrically disposed within said block.

6. A heater block as defined in claim 4 and further including a plurality of integral outwardly projecting nozzles located on one outer face of the block, a feeder aperture bored in an opposing face of the block and communicating with feeder passages extending past the heater element to said nozzles.

7. A heater block as defined in claim 4 and including a radially outwardly directed projection; heater element terminals extending outwardly from said projection and a socket means formed in said projection between the terminals to permit connection of a thermocouple element to the block.

References Cited

UNITED STATES PATENTS

| | | | |
|---|---|---|---|
| 1,617,489 | 2/1927 | Lightfoot | 338—230 |
| 2,181,157 | 11/1939 | Smith | 164—120 X |
| 2,469,800 | 5/1949 | Vogel | 338—230 |
| 3,133,843 | 5/1964 | Scherbner | 164—120 X |

RICHARD M. WOOD, *Primary Examiner.*

J. HOWARD FLINT, JR., *Examiner.*

C. L. ALBRITTON, *Assistant Examiner.*